(12) United States Patent
Boundy et al.

(10) Patent No.: US 7,903,180 B2
(45) Date of Patent: Mar. 8, 2011

(54) OVERHEAD MOUNTABLE SLIDING VIDEO DISPLAY ASSEMBLY AND METHOD

(75) Inventors: Timothy M. Boundy, Rochester Hills, MI (US); Eugene O. Pirrami, Jr., Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1319 days.

(21) Appl. No.: 11/131,040

(22) Filed: May 17, 2005

(65) Prior Publication Data

US 2006/0262189 A1 Nov. 23, 2006

(51) Int. Cl.
*H04N 5/72* (2006.01)
(52) U.S. Cl. ........................................ 348/837
(58) Field of Classification Search .................. 348/837; 296/37.7–37.8; 108/69
See application file for complete search history.

(56) References Cited

U.S. PATENT DOCUMENTS

| | | | | |
|---|---|---|---|---|
| 3,650,578 A | * | 3/1972 | Del Vecchio et al. | 384/18 |
| 5,775,762 A | * | 7/1998 | Vitito | 296/37.7 |
| 6,000,951 A | * | 12/1999 | Hansen et al. | 439/67 |
| 6,724,317 B1 | * | 4/2004 | Kitano et al. | 340/691.1 |
| 7,090,186 B2 | * | 8/2006 | Quinno et al. | 248/324 |
| 7,460,187 B2 | * | 12/2008 | Schedivy | 348/837 |
| 2003/0048051 A1 | * | 3/2003 | Kung et al. | 312/334.1 |
| 2004/0141095 A1 | | 7/2004 | Quinno et al. | |
| 2006/0050018 A1 | * | 3/2006 | Hutzel et al. | 345/60 |

FOREIGN PATENT DOCUMENTS

EP 0433524 A1 6/1991

* cited by examiner

*Primary Examiner* — Tung Vo
*Assistant Examiner* — Anner Holder
(74) *Attorney, Agent, or Firm* — Quinn Law Group, PLLC

(57) ABSTRACT

A mountable sliding video display assembly is provided for a vehicle in which the longitudinal position of the video display screen unit can be adjusted in the vehicle. The video display screen unit may be mounted behind the last row of occupants in a vehicle. An occupant may slide the video display screen unit to and fro in front of him/her to a comfortable viewing distance. A method for pivoting the video display screen unit is also provided so that the video display screen unit, in addition to longitudinal movement, can be rotated from a stowed position to a display position.

8 Claims, 3 Drawing Sheets

OVERHEAD MOUNTABLE SLIDING VIDEO DISPLAY ASSEMBLY AND METHOD

TECHNICAL FIELD

The present invention relates to a mountable sliding video display assembly for a vehicle in which the longitudinal position of the video display screen unit can be adjusted.

BACKGROUND OF THE INVENTION

Video display screen units in motor vehicles and airplanes are well known. The installation of large sunroof openings in vehicles is leading to video display screen units being mounted in locations other than overhead. Typically, they are mounted on the floor console or on the back of head restraints.

SUMMARY OF THE INVENTION

A mountable sliding video display assembly for a vehicle is provided. The mountable sliding video display assembly comprises a video display screen unit and a pair of tracks, including a first track and a second track, relatively longitudinally movable with respect to each other. The first track is adapted for mounting the pair of tracks to the vehicle. The second track has the video display screen unit mounted to it. Thus, the position of the video display screen unit may be adjusted in a direction in line with the pair of tracks.

In one aspect of the invention, ball bearings are placed between the pair of tracks to accommodate longitudinal movement of the tracks with respect to each other. A carrier plate is placed between the ball bearings and the first track.

In another aspect of the invention, the video display screen unit is pivotally mounted to the first track through an end bracket. This facilitates the rotational movement of the video display screen unit alternately from a display position to a stowed position. In another aspect of the invention, a retainer bracket is placed between the video display screen unit and the end bracket to accommodate pivoting of the video display screen unit.

In another aspect of the invention, the second track is mounted to an overhead compartment or roof of the vehicle through a mounting bracket. The mounting bracket has at least one tab extending into a straddling configuration with the second track.

In another aspect of the invention, flat electrical wiring is used for transmitting signals to the video display screen unit. The flat electrical wire moves as the pair of tracks move relatively with respect to each other. The carrier plate, between the ball bearings and the first track, has a raised portion configured to accommodate the movement of the flat wire when the pair of tracks moves relatively with respect to each other. In another aspect of the invention, the electrical wiring is in a loop which is longer than the relative longitudinal movement of the pair of tracks, to further accommodate the movement of the flat wire when the pair of tracks moves relatively with respect to each other.

A method for adjusting the position of a mountable video display assembly for a vehicle is provided. For a vehicle with a sunroof, the video display screen unit may be mounted to the rear of a sunroof and in front of a row of occupants. The occupant may slide the video display screen unit to and fro with respect to the sunroof opening in front of him/her to a comfortable viewing distance.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic side view of the overhead mountable sliding video display assembly of FIGS. 1 and 2, illustrating the movement of the video display screen unit between a rearward stowed position and a forward viewing position.

DESCRIPTION OF THE PREFERRED EMBODIMENTS

Figure 1:
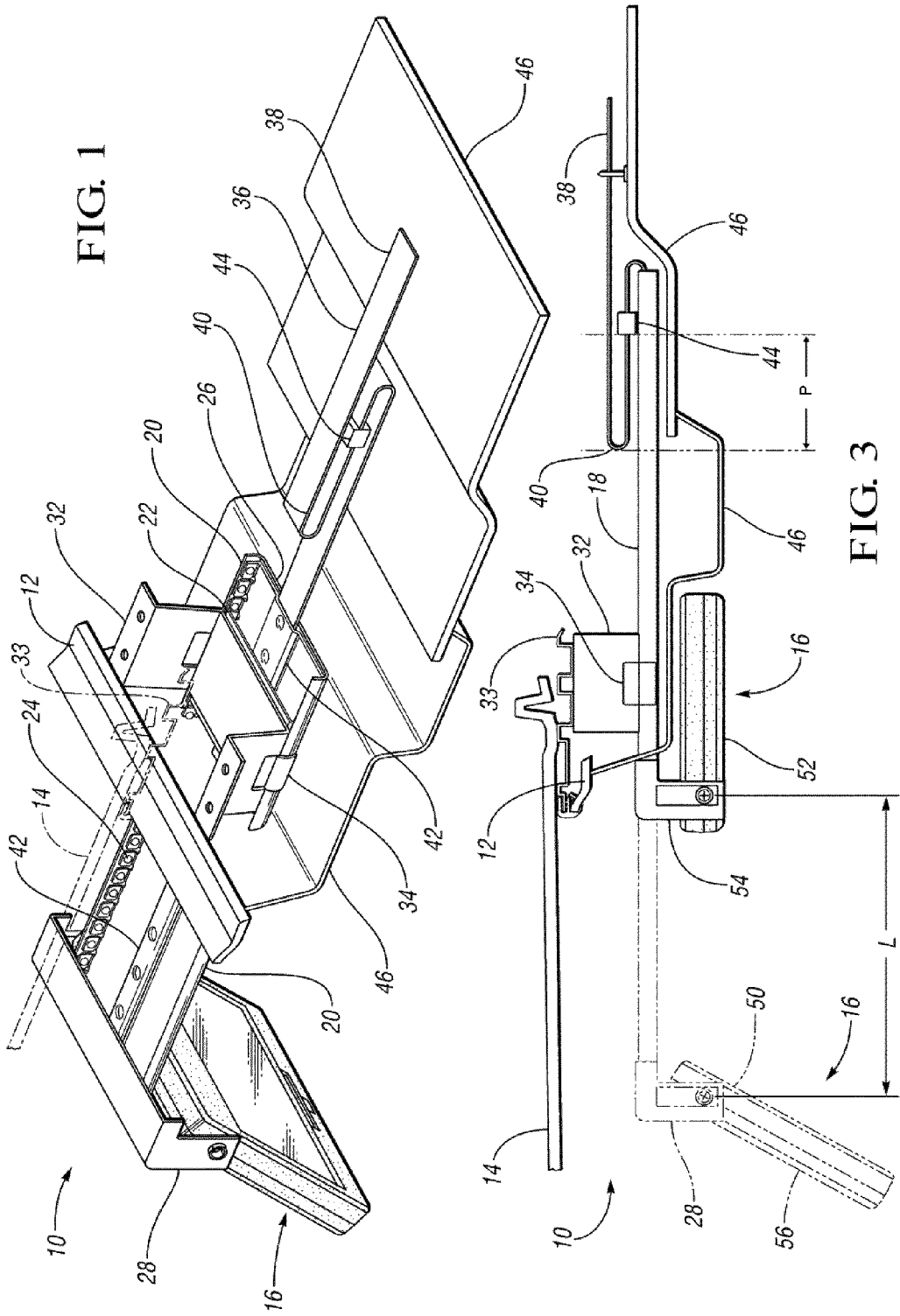
FIG. 1 is a schematic perspective view of the overhead mountable sliding video display assembly.

Referring now to the drawings, FIG. 1 shows a schematic perspective view of a mountable sliding video display assembly 10. The embodiment described herein is mounted on the overhead compartment 12, to the rear of the sunroof 14 of a vehicle, see FIG. 4. However, the mountable sliding video display assembly 10 may be mounted on a different location in the vehicle within the scope of this invention.

Figure 2:
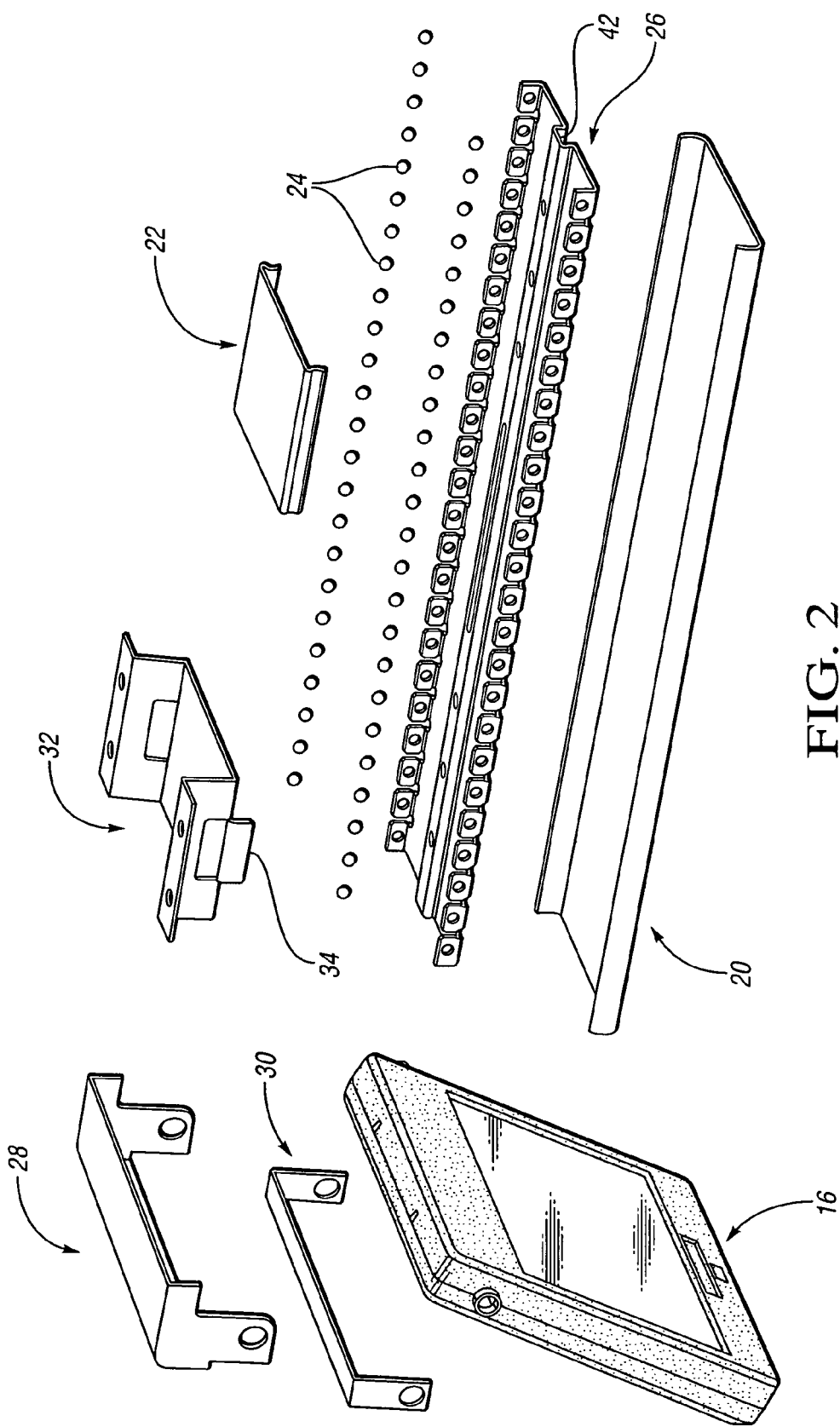
FIG. 2 is an exploded view of the components of the overhead mountable sliding video display assembly of FIG. 1.

FIG. 2 illustrates an exploded view of the components of the overhead mounted sliding video display assembly. FIG. 3 is a schematic side view of the mountable sliding video display assembly 10, illustrating the movement of the video display screen unit 16. As illustrated in FIGS. 1-3, the mountable sliding video display assembly 10 is characterized by a video display screen unit 16 and a sliding track assembly unit 18. The sliding track assembly unit 18 is characterized by a pair of tracks, a first track 20 and a second track 22. The first track 20 and the second track 22 are relatively longitudinally movable with respect to each other. Ball bearings 24 are placed between the first track 20 and the second track 22 to accommodate the longitudinal movement of the tracks with respect to each other. A carrier plate 26 for the ball bearings 24 is placed between the first track 20 and the ball bearings 24 for support.

The first track 20 is adapted for mounting the video display screen unit 16. The video display screen unit 16 may be pivotally mounted to the first track 20. An end bracket 28 is used to pivotally mount the video display screen unit 16 to the first track 20. A retainer bracket 30 is placed between the video display screen unit 16 and the end bracket 28 to accommodate the pivoting of the video display screen unit 16. The brackets may be attached by welding or other means.

The second track 22 is adapted for mounting the sliding track assembly unit 18 to the overhead compartment 12 or roof of the vehicle. The second track 22 is connected to a mounting bracket 32. The mounting bracket 32 is operatively connected to the overhead compartment 12 or roof of the vehicle through a support bracket 33. As shown in FIGS. 1 and 2, the mounting bracket 32 has tabs 34 extending into a straddling configuration with the first track 20.

An electrical wiring system 36 is used for transmitting electrical signals to the video display screen unit 16. FIGS. 1 and 3 illustrate a flat electrical wire 38. The flat electrical wire 38 is in a loop 40. The flat wire 38 moves as the pair of tracks move relatively with respect to each other. As shown in FIG. 2, the carrier plate 26 has a raised portion 42, approximately in its center, configured to accommodate the movement of the flat wire 38 when the first track 20 and second track 22 move relatively with respect to each other. As shown in FIG. 1, the flat wire 38 fits in the passage 43 between the raised portion 42 of the carrier plate 26 and the first track 20. The movement of the flat wire 38 is further facilitated by a fixed plastic channel 44. Trim bezel 46 is placed under the sliding track assembly unit 18 and electrical wiring system 36 to conceal the electrical wiring system from view.

Figure 4:
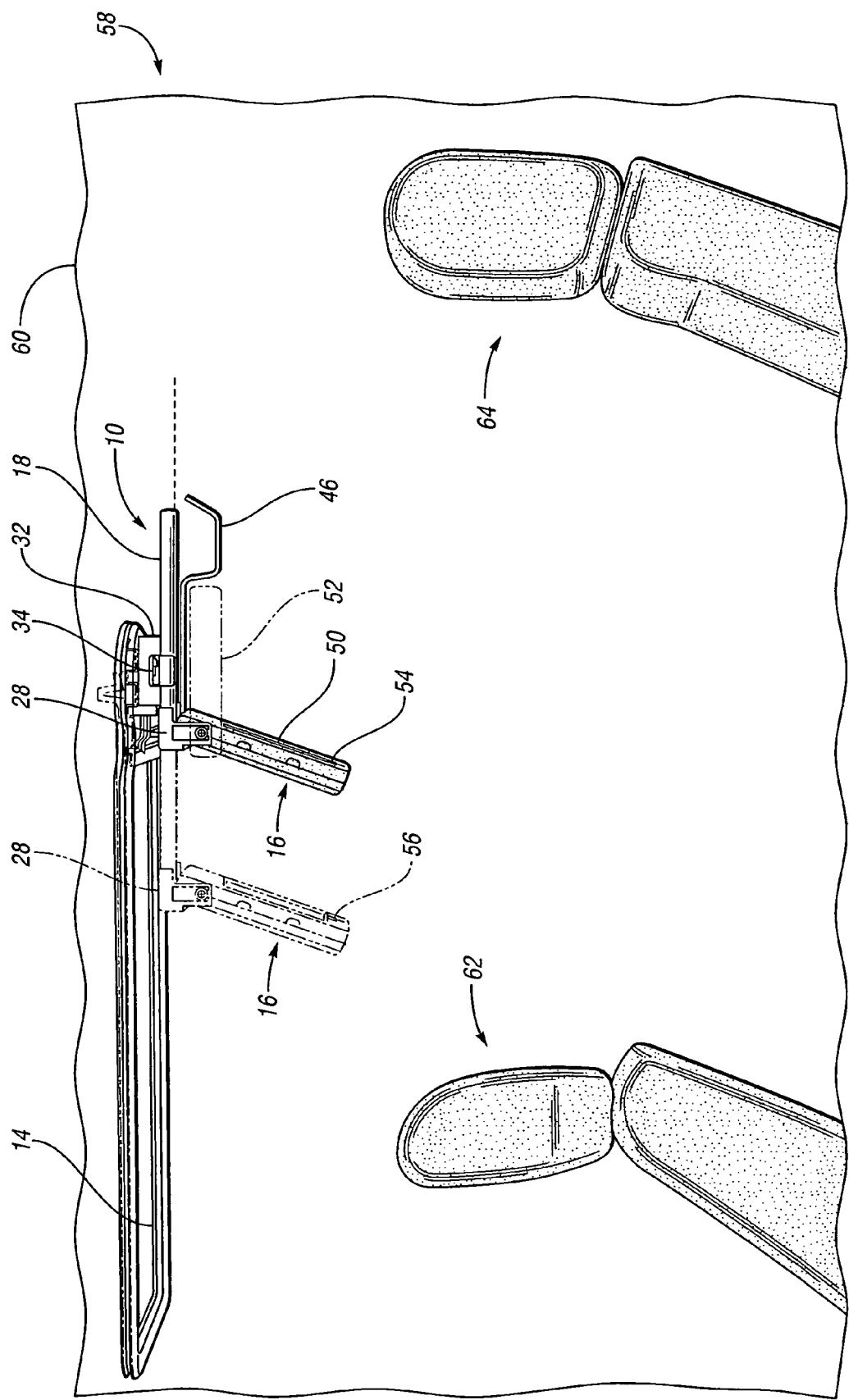
FIG. 4 is a fragmentary schematic side view of a vehicle passenger compartment showing the overhead mountable sliding video display assembly relative to the vehicle's front and second row of occupant seats and the vehicle's sunroof.

Referring to FIG. 3, a side view of the mountable sliding video display assembly 10 illustrating the longitudinal and rotational movement of the video display screen unit 16 is shown. The video display screen unit 16 is pivotally mounted to the first track 20, allowing it to be rotated from a display position 50 to a stowed position 52, as illustrated in FIGS. 3 and 4. The video display screen unit 16 may be slid to and fro anywhere from the rear-most position 54 to the forward-most position 56. The longitudinal distance between the rear-most position 54 of the video display screen unit 16 and the forward-most position 56 is denoted as L, as shown in FIG. 3. The flat electrical wire 38 is in a substantially U-shaped loop 40, shown in FIGS. 1 and 3, the length of which is longer than the relative longitudinal movement of the first track 20 and second track 22 i.e. the length P of the loop 40, from the plastic channel 44 to the curved portion indicated by lead line 40 in FIG. 3, is at least half of the length L. The loop 40 helps to accommodate the movement of the flat wire 38 when the pair of tracks moves relatively with respect to each other.

FIG. 4 is a fragmentary schematic side view of a vehicle 58 with a passenger compartment 60 showing the overhead mountable sliding video display assembly 10 relative to the vehicle's front and second row of occupant seats and the vehicle's sunroof 14. The sliding track assembly 18 is mounted to the overhead compartment 12 of the vehicle 58, to the rear of the sunroof 14. The sliding track assembly 18 is mounted to the rear of the front row occupant seat 62. An occupant in the second row seat 64 or third row seat (not shown) may slide the video display screen unit 16 to and fro in front of him/her to a comfortable viewing distance. The occupant may slide the video display screen unit 16 to and fro anywhere between the rear-most position 54 and the forward-most position 56. In the forward-most position 56, the video display screen unit 16 is below the sunroof 14, which is not otherwise possible. The video display screen unit 16 can be rotated from a display position 50 to a stowed position 52.

While the best mode for carrying out the invention has been described in detail, those familiar with the art to which this invention relates will recognize various alternative designs and embodiments for practicing the invention within the scope of the appended claims.

The invention claimed is:

1. A mountable sliding video display assembly for a vehicle comprising:
   a video display screen unit movable between a rear-most position and a forward-most position, the rear-most position and the forward-most position being spaced by a longitudinal distance L;
   a pair of tracks, including a first track and a second track, relatively longitudinally movable with respect to each other;
   said second track being adapted for mounting said pair of tracks to the vehicle;
   said first track having said video display screen unit mounted thereto;
   ball bearings between said pair of tracks to accommodate longitudinal movement of said first track and said second track with respect to each other;
   a carrier plate between said ball bearings and said first track, the carrier plate having a raised portion approximately in the center of the carrier plate;
   wherein the carrier plate includes openings approximately in the periphery of the carrier plate, the ball bearings being fitted in the openings;
   wiring connected to said video display screen unit, the wiring being flat;
   a passage between the first track and the raised portion of the carrier plate such that the wiring fits in the passage;
   wherein the wiring moves in the passage when the pair of said tracks moves relatively with respect to each other;
   wherein said video display screen unit is pivotally mounted to said first track to allow the video display screen unit to rotate between the rear-most position and a rearward stowed position;
   wherein the wiring forms a substantially U-shaped loop configured to allow the video display screen unit to move between the forward-most position, the rear-most position and the rearward stowed position; and
   wherein the U-shaped loop has a length that is at least half the longitudinal distance L between the rear-most position and the forward-most position of the video display screen unit.

2. The mountable sliding video display assembly of claim 1, further comprising an end bracket, wherein said video display screen unit is pivotally mounted to said first track through said end bracket.

3. The mountable sliding video display assembly of claim 2, further comprising a retainer bracket, wherein said retainer bracket is between said video display screen unit and said end bracket to accommodate pivoting of said video display screen unit.

4. The mountable sliding video display assembly of claim 1, further comprising a vehicle and wherein said second track is mounted to an overhead compartment or roof of said vehicle.

5. The mountable sliding video display assembly of claim 1, further comprising the vehicle and a mounting bracket, wherein said second track is mounted to an overhead compartment or roof of said vehicle through said mounting bracket; and
   wherein said mounting bracket has at least one tab extending into a straddling configuration with said second track.

6. A vehicle comprising:
   a sunroof;
   an overhead sliding video display screen unit mountable with respect to said sunroof;
   a pair of tracks relatively longitudinally movable with respect to each other;
   one of said pair of tracks being mounted to said vehicle adjacent said sunroof;
   the other of said pair of tracks being pivotally mounted to said video display screen unit and movable with respect to said sunroof;
   wherein said pair of tracks are sufficiently slideable such that said video display screen unit may be positioned below said sunroof;
   ball bearings between said pair of tracks to accommodate longitudinal movement of said pair of tracks with respect to each other;
   wiring connected to said video display screen unit, said wiring being flat;
   a carrier plate operatively connected to the other of said pair of tracks, said carrier plate having a raised portion approximately in the center of the carrier plate;

wherein the carrier plate includes openings approximately in the periphery of the carrier plate, the ball bearings being fitted in the openings;

a passage between the first track and the raised portion of the carrier plate such that the wiring fits in the passage;

wherein the wiring moves in the passage when said pair of said tracks moves relatively with respect to each other;

wherein the video display screen unit is movable between a forward-most position, a rear-most position and a rearward stowed position;

wherein the wiring forms a substantially U-shaped loop configured to allow the video display screen unit to move between the forward-most position, the rear-most position and the rearward stowed position; and wherein the U-shaped loop has a length that is at least half the longitudinal distance L between the rear-most position and the forward-most position of the video display screen unit.

7. The mountable sliding video display assembly of claim 1, wherein the raised portion of the carrier plate is substantially uniform along a longitudinal length of the carrier plate.

8. The vehicle of claim 6, wherein the raised portion of the carrier plate is substantially uniform along a longitudinal length of the carrier plate.

* * * * *